United States Patent Office 3,254,094
Patented May 31, 1966

---

3,254,094
3-IMINO-2,1-BENZISOTHIAZOLES
Stephen T. Ross, Berwyn, Pa., assignor to Smith Kline & French Laboratories, Philadelphia, Pa., a corporation of Pennsylvania
No Drawing. Filed Oct. 20, 1964, Ser. No. 405,251
8 Claims. (Cl. 260—304)

This invention relates to novel 3-imino-1,3-dihydro-2,1-benzisothiazoles having useful pharmacological activity. More specifically the compounds of this invention have analgetic, antipyretic, mild tranquilizing and muscle relaxant activity.

The novel 3-imino-1,3-dihydro-2,1-benzisothiazoles of this invention are represented by the following general structural formula:

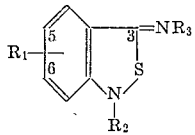

Formula I
in which:

$R_1$ represents hydrogen, halogen of atomic weight less than 80 or trifluoromethyl, preferably the substituent is in the 5- or 6-position;
$R_2$ represents hydrogen, lower alkyl or phenyl; and
$R_3$ represents hydrogen or lower alkyl.

The term lower alkyl where used herein signifies aliphatic groups of from one to four, preferably one to two, carbon atoms.

Advantageous compounds are represented by Formula I above when $R_1$ is chlorine or trifluoromethyl, preferably in position 5.

A preferred compound is 3-imino-1,3-dihydro-5-trifluoromethyl-2,1-benzisothiazole.

This invention also includes salts of the above defined bases formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, hexamic, fumaric, benzoic, ascorbic, pamoic, succinic, bismethylenesalicylic, methanesulfonic, ethanedisulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzenesulfonic and theophylline acetic acids as well as with the 8-halotheophyllines, for example, 8-bromotheophylline. Exemplary of such inorganic salts are those with hydrochloric, hydrobromic, hydroiodic, sulfuric, sulfamic, phosphoric and nitric acids. Of course these salts may also be prepared by the classical method of double decomposition of appropriate salts which is well-known to the art.

The imino benzisothiazoles of this invention are prepared by the following general procedure:

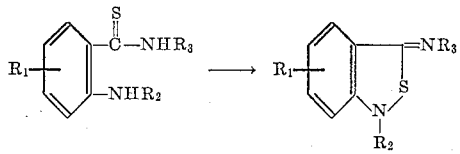

Formula II
wherein $R_1$, $R_2$ and $R_3$ are as defined above. Thus, a 2-amino-benzthioamide as shown in Formula II is ring closed to form the 2,1-benzisothiazole using a mild oxidizing agent, for example potassium triiodide or a halogen: iodine, bromine or chlorine. Employing potassium triiodide, the reaction is advantageously carried out in an aqueous system, for example aqueous alcoholic solution such as methanol or ethanol at from 0–80° C., preferably at ambient or room temperature, for from 30 minutes to several hours. The reaction product is isolated as the hydroiodide salt of the 2,1-benzoisothiazole and if desired, the salt is treated with a weak inorganic or organic base to yield the benzisothiazole free base. Preferably, when $R_2$ of Formula I is hydrogen, sodium carbonate solution is employed to generate the free base. Further reaction with acids yields other salts as described hereinabove.

Employing a halogen (iodine, bromine or chlorine) as the mild oxidizing agent, the above reaction is advantageously carried out in a dilute solution using a suitable solvent which is unreactive toward the oxidizing agent, such as for example acetic acid, in a similar temperature range.

The 2-aminobenzthioamide starting materials used as described above are either known or are prepared by one of several procedures. The following procedure is used to prepare the N-unsubstituted amido compounds of Formula II above:

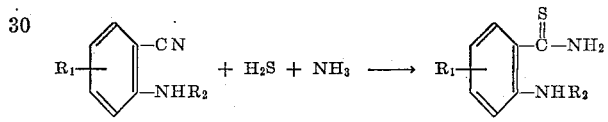

Thus an anthanilonitrile is reacted with a mixture of liquid ammonia and gaseous hydrogen sulfide (ammonium sulfide) in an inert solvent such as Cellosolve, under pressure, for from four to eight hours to give upon workup the benzthioamide compound. The anthranilonitriles used as above are either known or are prepared by methods such as those set forth in the examples hereinbelow.

To prepare the N-substituted amido compounds of Formula II the following procedure is used:

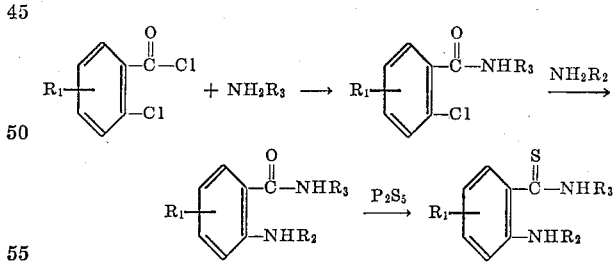

wherein $R_1$ and $R_2$ are as defined hereinabove and $R_3$ is lower alkyl. Thus a 2-chlorobenzoyl halide (prepared from the corresponding carboxylic acid as set forth in the examples hereinbelow) is treated with a lower alkyl amine to yield the N-loweralkyl-2-chlorobenzamide which is reacted with ammonia or an amine in the presence of copper powder and a copper salt. The resulting N-lower alkyl-2-aminobenzamide is converted to the corresponding benzthioamide by the action of phosphorus pentasulfide.

The following examples illustrate in more detail the procedures for the preparation of the compounds of Formula I. It will be obvious to one skilled in the art that variations of these procedures may be employed to the same advantage. The specific compounds described in these examples is not intended to limit the scope of this invention which is defined by Formula I and the claims.

Example 1

A mixture of 648 g. of 4-chloro-3-cyanobenzotrifluoride, one liter of liquid ammonia, 4 g. cuprous chloride and 4 g. of copper powder is heated at 115–120° C. in a closed reaction vessel. The pressure climbs to 1030 pounds. The reaction vessel is washed with isopropanol and the filtered catalyst is washed with isopropanol and ether. The filtrate is concentrated and distilled to yield 5-trifluoromethylanthranilonitrile, B.P. 95–115° C./0.4–0.7 mm. The product recrystallizes from benzene and cyclohexane to melt at 72–74° C.

Liquid ammonia (about 10 ml.) is dissolved in 75 ml. of Cellosolve and gaseous hydrogen sulfide is passed in for 15–20 minutes at 5° C. A solution of 5.0 g. of the above 5-trifluoromethylanthranilonitrile in 10 ml. of Cellosolve is added and the mixture is placed in a glass bomb which is then heated in a steam bath with occasional shaking. After four hours the bomb is cooled and the contents is concentrated to dryness under reduced pressure. The residue is recrystallized from benzene-heptane to give 2 - amino - 5 - trifluoromethylbenzthioamide, M.P. 119–121° C.

The above thioamide (2.05 g.) is dissolved in a mixture of 50 ml. of methanol and 50 ml. of water. A solution of 20 g. of potassium iodide and 2.36 g. of iodine in 50 ml. of water is added dropwise with stirring to the thioamide solution. The temperature is kept below 15° C. The mixture is stirred for two hours, then filtered to give 3-imino-1,3-dihydro - 5 - trifluoromethyl-2,1-benzisothiazole hydroiodide. The free base is obtained by treating a methanolic solution of the hydroiodide with excess aqueous sodium carbonate solution. After recrystallization from benzene the free base product melts at 202–203° C.

Example 2

To a solution of 6.0 g. of 2-aminobenzthioamide in 250 ml. of 50% aqueous methanol is added with stirring, a solution of 81 g. of potassium iodide and 10.0 g. of iodine in 250 ml. of water. The temperature is kept below 10° C. The mixture is stirred for one hour and filtered to give 3-imino-1,3-dihydro - 2,1 - benzisothiazole hydroiodide. The free base is obtained by treating a methanolic solution of the hydroiodide with excess aqueous sodium carbonate solution. After recrystallization from ethanol the free base melts at 169.5–171.5° C.

Example 3

To 21 g. of dry pyridine is added slowly with stirring, 23 g. of cuprous cyanide. The mixture rapidly solidifies and is then heated to 125° C. Excess pyridine is boiled off and the temperature decreased to 110° C. With stirring, 48 g. of 3-amino-4-bromobenzotrifluoride is added slowly and the mixture heated to 165–170° C. This temperature is maintained for 75 minutes and then the reaction mixture is cooled to 90° C. A concentrated solution of sodium cyanide (75 g. in 75 ml. of water) is added, followed by 250 ml. of benzene. The mixture is stirred for one hour and the separated benzene layer is washed with water, dried and evaporated. The residue is distilled at 122–127° C. and 7.0 mm. to give 4-trifluoromethylanthranilonitrile which solidifies, melting at 86–89° C.

Following the procedure of Example 1, 10.0 g. of the above 4-trifluoromethylanthranilonitrile is reacted with ammonium sulfide in 75 ml. of Cellosolve to give 4-trifluoromethyl-2-aminobenzthioamide, M.P. 102–107° C. The thioamide (8.1 g.) thus prepared is reacted with an aqueous solution of 81 g. of potassium iodide and 9.35 g. of iodine. The reaction mixture is stirred for one hour and filtered to give 3-imino-1,3-dihydro-6-trifluoromethyl-2,1-benzisothiazole hydroiodide. The free base melts at 164.5–166° C. upon recrystallization from benzene.

Example 4

To a suspension of 46.2 g. of sodium hydride (52% in mineral oil) in 1500 ml. of dimethyl sulfoxide is added 121 g. of formanilide with stirring. A dimethyl sulfoxide solution of 102.7 g. of 4-chloro-3-cyanobenzotrifluoride is added and the mixture heated to 90° C. over 30 minutes. After an additional 30 minutes at that temperature, 30 ml. of glacial acetic acid is added dropwise and the mixture is cooled, diluted with water and extracted with ether. The extract is water extracted and evaporated to dryness. The residue is distilled under vacuum to give N-phenyl-5-trifluoromethylanthranilonitrile which solidified, M.P. 91–93° C.

A mixture of 5.0 g. of the above anthranilonitrile, 6.0 g. of ammonium sulfide and 40 ml. of Cellosolve is heated in a pressure bottle at 100° C. for five hours. The reaction mixture is cooled, filtered and the filtrate evaporated to dryness. The residue is taken up in hot cyclohexane, filtered and cooled to give 2-(N-phenylamino)-5-trifluoromethylbenzthioamide, M.P. 114–115° C.

The above thioamide (4.3 g.) is dissolved in 200 ml. of methanol and an aqueous solution of potassium triiodide (3.70 g. of iodine and 40 g. of potassium iodide in 100 ml. of water) is added dropwise over 30 minutes. The reaction mixture is diluted with water and the precipitate filtered off to give 3-imino-1-phenyl-1,3-dihydro-5-trifluoromethyl-2,1-benzisothiazole hydroiodide, M.P. 161–163° C. (d.).

Similarly, by employing 73 g. of N-ethylformamide instead of the formanilide in the above reaction and carrying the resulting N-ethyl-5-trifluoromethylanthranilonitrile through the ensuing procedures there is obtained the corresponding product, 3-imino-1-ethyl-1,3-dihydro-5-trifluoromethyl-2,1-benzisothiazole hydroiodide.

Example 5

A mixture of 105 g. of 4-chloro-3-cyanobenzotrifluoride, 70 g. of sodium hydroxide, 200 ml. of ethanol and 700 ml. of water is stirred at reflux for six and one-half hours. The solution is cooled, filtered and the filtrate extracted with ether and then benzene. The aqueous layer is treated with charcoal, refiltered and then acidified with excess hydrochloric acid to precipitate 2-chloro-5-trifluoromethylbenzoic acid, M.P. 92.5–95° C. This benzoic acid (108 g.) is stirred with 250 ml. of thionyl chloride for one hour and refluxed for two hours. The excess thionyl chloride is distilled at the water pump and the residue distilled to give 2-chloro-5-trifluoromethylbenzoyl chloride, B.P. 113–117° C./ca. 20 mm.

Ten grams of the above 2-chloro-5-trifluoromethylbenzoyl chloride in ether is treated with gaseous methyl amine for 30 minutes. The methylamine hydrochloride is filtered off and the filtrate evaporated to dryness to give N - methyl - 2-chloro-5-trifluoromethylbenzamide. This amide is dissolved in Cellosolve containing 10 g. of methylamine and 0.2 g. each of copper powder and copper sulfate is added. The mixture is heated at 140° C. for 40 hours, cooled, filtered and the filtrate evaporated. The residue, N - methyl-2-methylamino-5-trifluoromethylbenzamide, is dissolved in pyridine and 10 g. of phosphorus pentasulfide is added. This mixture is refluxed for one hour, then poured into water and filtered to give N-methyl-2-methylamino-5-trifluoromethylbenzthioamide.

After recrystallization from benzene, the above thioamide is dissolved in aqueous methanol and an equimolar quantity of iodine dissolved in an excess of aqueous potassium iodide solution is added. The resulting hydroiodide salt of 3 - methylimino-1-methyl-1,3-dihydro-5-trifluoromethyl-2,1-benzisothiazole is filtered off and the base generated by careful addition of aqueous sodium carbonate.

Example 6

Following the general procedure of Example 1, 4.1 g. of 5-chloroanthranilonitrile is reacted with ammonium sulfide (ammonia and hydrogen sulfide) in 75 ml. of Cellosolve under pressure to give 2-amino-5-chlorobenzthioamide. The thioamide thus prepared is reacted in aqueous methanol solution with an equimolar amount of iodine and an excess of potassium iodide. The reaction mixture is stirred at room temperature for one hour and then filtered to give 3-imino-1,3-dihydro-5-chloro-2,1-benzisothiazole hydroiodide. The free base is obtained by treating a methanolic solution of the hydroiodide with excess aqueous sodium carbonate solution.

Similarly, by following this procedure and employing 5.3 g. of 5-bromoanthranilonitrile or 3.7 g. of 5-fluoroanthranilonitrile there is obtained 3-imino-1,3-dihydro-5-bromo-2,1-benzisothiazole and 3-imino-1,3-dihydro-5-fluoro-2,1-benzisothiazole, respectively.

What is claimed is:

1. A chemical compound of the class consisting of a free base and its nontoxic, pharmaceutically acceptable acid addition salts, said free base having the formula:

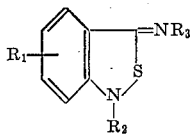

wherein:

$R_1$ is a member selected from the group consisting of hydrogen, halogen of atomic weight less than 80 and trifluoromethyl;

$R_2$ is a member selected from the group consisting of hydrogen, lower alkyl of from 1 to 4 carbon atoms and phenyl; and $R_3$ is a member selected from the group consisting of hydrogen and lower alkyl of from 1 to 4 carbon atoms.

2. A chemical compound of the formula:

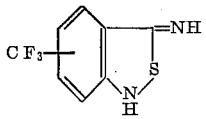

3. A chemical compound of the formula:

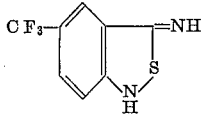

4. A chemical compound of the formula:

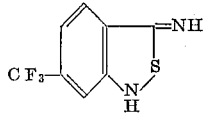

5. A chemical compound of the formula:

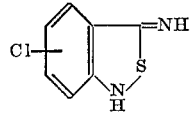

6. A chemical compound of the formula:

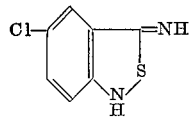

7. A chemical compound of the formula:

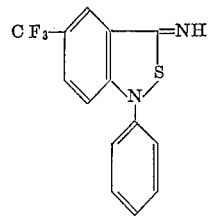

8. The method of preparing 3-imino-2,1-benzisothiazole hydroiodide salts of the formula:

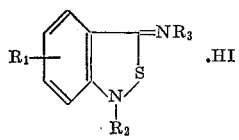

wherein:

$R_1$ is a member selected from the group consisting of hydrogen, halogen of atomic weight less than 80 and trifluoromethyl;

$R_2$ is a member selected from the group consisting of hydrogen, lower alkyl of from 1 to 4 carbon atoms and phenyl; and $R_3$ is a member selected from the group consisting of hydrogen and lower alkyl of from 1 to 4 carbon atoms, which comprises oxidizing with potassium triiodide a benzthioamide of the formula:

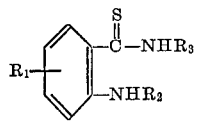

wherein $R_1$, $R_2$ and $R_3$ are as defined above.

References Cited by the Examiner

UNITED STATES PATENTS

| | | | |
|---|---|---|---|
| 2,032,465 | 3/1936 | Bradley et al. | 260—465 |
| 2,803,640 | 8/1957 | Heckert | 260—465 |
| 3,014,041 | 12/1961 | Hausermann et al. | 260—304 |
| 3,170,955 | 2/1965 | Richards et al. | 260—558 |
| 3,178,475 | 4/1965 | Schmidt et al. | 260—558 |
| 3,187,001 | 6/1965 | Meyer et al. | 260—304 |

NICHOLAS S. RIZZO, *Primary Examiner.*

HENRY R. JILES, *Examiner.*

ALTON D. ROLLINS, *Assistant Examiner.*